United States Patent [19]

Fiori

[11] 3,787,617

[45] Jan. 22, 1974

[54] MAGNETIC TAPE EDITING METHOD AND SYSTEM

[75] Inventor: Anthony M. Fiori, Schwenksville, Pa.

[73] Assignee: Spectra-Vision Corporation, Philadelphia, Pa.

[22] Filed: May 15, 1972

[21] Appl. No.: 253,577

[52] U.S. Cl. ...... 179/100.2 B, 178/6.6 A, 178/6.7 A

[51] Int. Cl. ...... G11b 5/00

[58] Field of Search. 179/100.2 B; 178/6.6 A, 6.7 A

[56] References Cited

UNITED STATES PATENTS

| | | | |
|---|---|---|---|
| 3,463,877 | 8/1969 | Crum | 179/100.2 B |
| 3,646,260 | 2/1972 | Bolger | 178/6.6 A |
| 3,655,910 | 4/1972 | Wada et al. | 178/6.6 A |

*Primary Examiner*—Raulfe B. Zache

*Attorney, Agent, or Firm*—Howson and Howson, John C. Dorfman, Esq.

[57] ABSTRACT

In making a composite edited tape from at least one master tape, back-spacing of both the master and edit tapes is accomplished by positive fixed speed drives on each tape deck, each in combination with a timer precisely measuring back-spacing distance so that the tape back-spacing will be the same from one time to another, the time in each case being that time which is necessary for its associated tape deck to reach proper speed for recording at the point of edit. The back-spacing times of decks requiring less back-spacing are increased to correspond to that of the slowest to respond. A timing mechanism is started at the same time both tape decks are started causing the edit tape deck to start to record when the decks are up to speed and ready for recording at the point of edit.

16 Claims, 3 Drawing Figures

MAGNETIC TAPE EDITING METHOD AND SYSTEM

Figure 1:
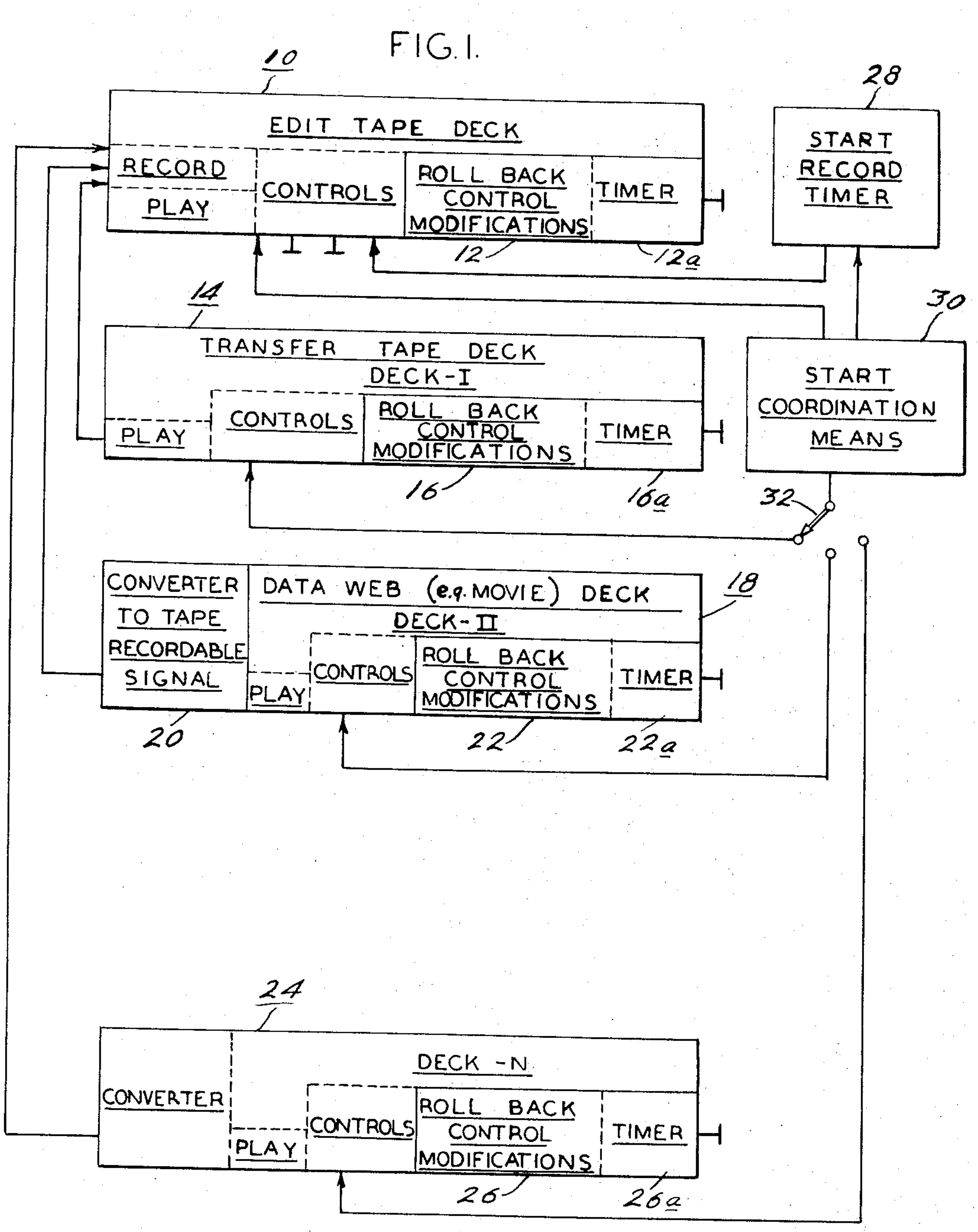

This invention relates to a method or process for editing magnetic tape and a system for accomplishing such editing. The tape involved can be video, audio, instrumentation, or data tape and the system can be recorders and players for any such tapes. It is also possible to edit onto video tape from movie film using known techniques for the transfer within the scope of the invention.

Magnetic tapes, unlike movie film cannot be suitably edited by cutting and splicing. As a practical matter, magnetic tapes of all types are edited by making a new edited tape from one or more tapes on which the original recording has been done. Considering a typical video tape problem, in producing a television drama, for example, it may be more convenient to record scenes out of order of the sequence in which they will appear on television. For example, if scenes 2 and 5 are taken in one setting it may be of advantage to take scene 2 and then immediately take scene 5, later recording, out of sequence, scenes 3 and 4. When this is done, the editing process will interpose scenes 3 and 4 between scenes 2 and 5. Editing requires knowing or being able to determine precisely where one scene ends and the next scene begins on the tape. In making the edited tape, for example, after transferring scene 2 to the edited tape, the edit tape deck is stopped precisely at the end of scene 2. This can be done by visually observing the picture produced from the master tape at the time it is being edited and transferred to the edited tape. Then while the edit tape deck is stopped, the tape used in taking the scenes must be rolled ahead to the point where scene 3 begins. When scene 3 is found, it is not possible to simply start up the edit tape deck and start recording. In order to get a proper recording a tape deck must be up to speed before recording starts. This requires back-spacing the tape before recording to allow each tape transport to accelerate to recording speed so that recording can begin the proper place.

As a practical matter, in the prior art, editing has been done as a matter of guess work with the editor making his best judgment about how far to backup each tape deck and then trying to synchronize the master and edit tape decks so that the edit points occur at the same time. Editors have had to guess and either took long periods on the average or produced edited products of variable quality. Others have used various aids such as measuring the tape and marking a starting place physically with markers, or ink, but this is tedious, time consuming and subject to error. Until the present invention no really satisfactory solution has been reached.

The purpose of the present invention is to permit the editor as he observes the picture and sees the point of edit, to press a back space button and begin the back space cycle in order to dynamically brake and reverse the deck, starting while the edit deck is running in its normal play direction. At the end of this back space cycle, the decks will have moved the web to a scene or point of roll, a known period of time from the point of edit. The distance in time from the point of roll to the point of edit will always be the same.

In accordance with the present invention, a timer is used to measure off the precise roll-back or back-spacing of tape required for each of the tape decks to come up to speed from stop. Roll-back is accomplished preferably by reversing the capstan motor to achieve backup. Once proper roll-back time is found the timer permits its rapid repetition on the same deck time after time. The timer is adjustable so that in the absence of the unlikely event that the roll-back was correct on the first attempt, roll-back can then be adjusted emperically, by observation, by adjusting the setting of the timer until the amount of backup necessary to bring the tape up to the speed at the edit point from a dead stop is found. Adjustment or calibration of each tape deck is preferably done by observation and changing the timer without ever actually measuring the roll-back of the tape decks. Once the edit or cue point is reached, and only after the deck is up to recording speed, the timer is permanently left at that setting, subject to compensating adjustment mentioned below. In this way the proper amount of backup for a tape deck or movie machine can be relatively quickly determined and thereafter remains the same.

In editing two decks are used and in most cases they will have dynamic characteristics. In order to compensate for the overshoot differences in the two decks caused by different inertial characteristics and start up lag in the two decks, the roll-back time on the timer of the deck with the greater overshoot is increased until the point of roll of the two decks correspond with one another.

Thereafter in use no further adjustment of the timers is made and tapes used in the editing process are backed up from the point of edit to their respective starting points by the push of a button. Pushing a common forward motion "roll" button will then start the tape decks together, and their controls have rolled back each of the tapes a distance such that they will reach the edit point at the same time. Means is then provided to switch the edit tape deck into record mode at the proper edit point, that is, in the video example, just as the last scene ended so that the next scene is recorded immediately or with desired timing. amount being From an apparatus standpoint both edit and master tape decks are provided with very positive reverse drive for the tape, if not already provided on the tape deck. The reverse drive is provided by a synchronous, or other type of clock drive together with a positive non-slip tape engagement mechanism means so that for any predetermined amount of drive time a fixed unvarying amount of tape will be fed backwards through the drive. Ordinarily the same drive motor can and should be used in reverse to keep the same characteristics, but this frequently involves modification of the deck controls to permit reversing the capstan drive motor. A timing means must be added to the deck to time the roll-back of the tape a precise predetermined amount, that predetermined amounts being the amount necessary for the tape deck to get up to speed at or before the edit point. The timing means is adjustable so that emperical setting of the timing mechanism to achieve proper time observation is possible as previously explained.

One of the timers added on one of the decks or a separate adjustable timer is also employed to put the edit tape deck in record mode just at the proper edit point. If a separate timer is used it is again set, preferably emperically by observation.

Figure 2:
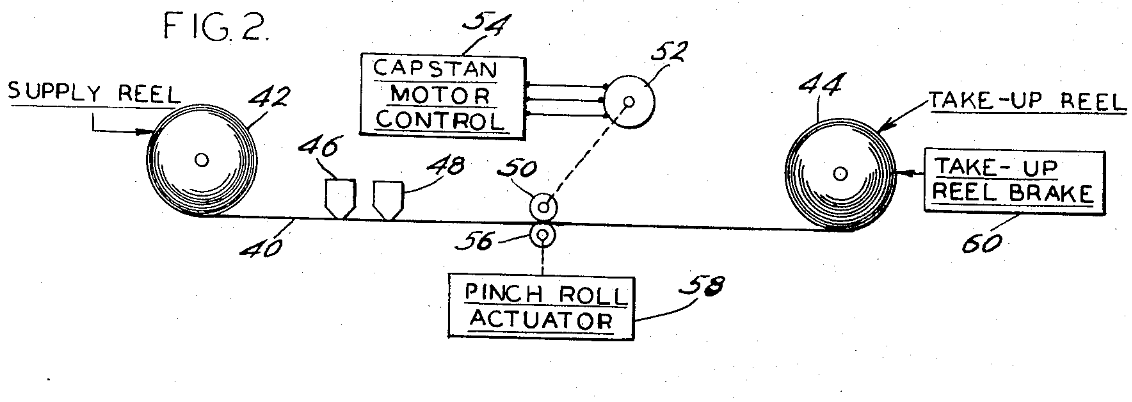
Figure 3:
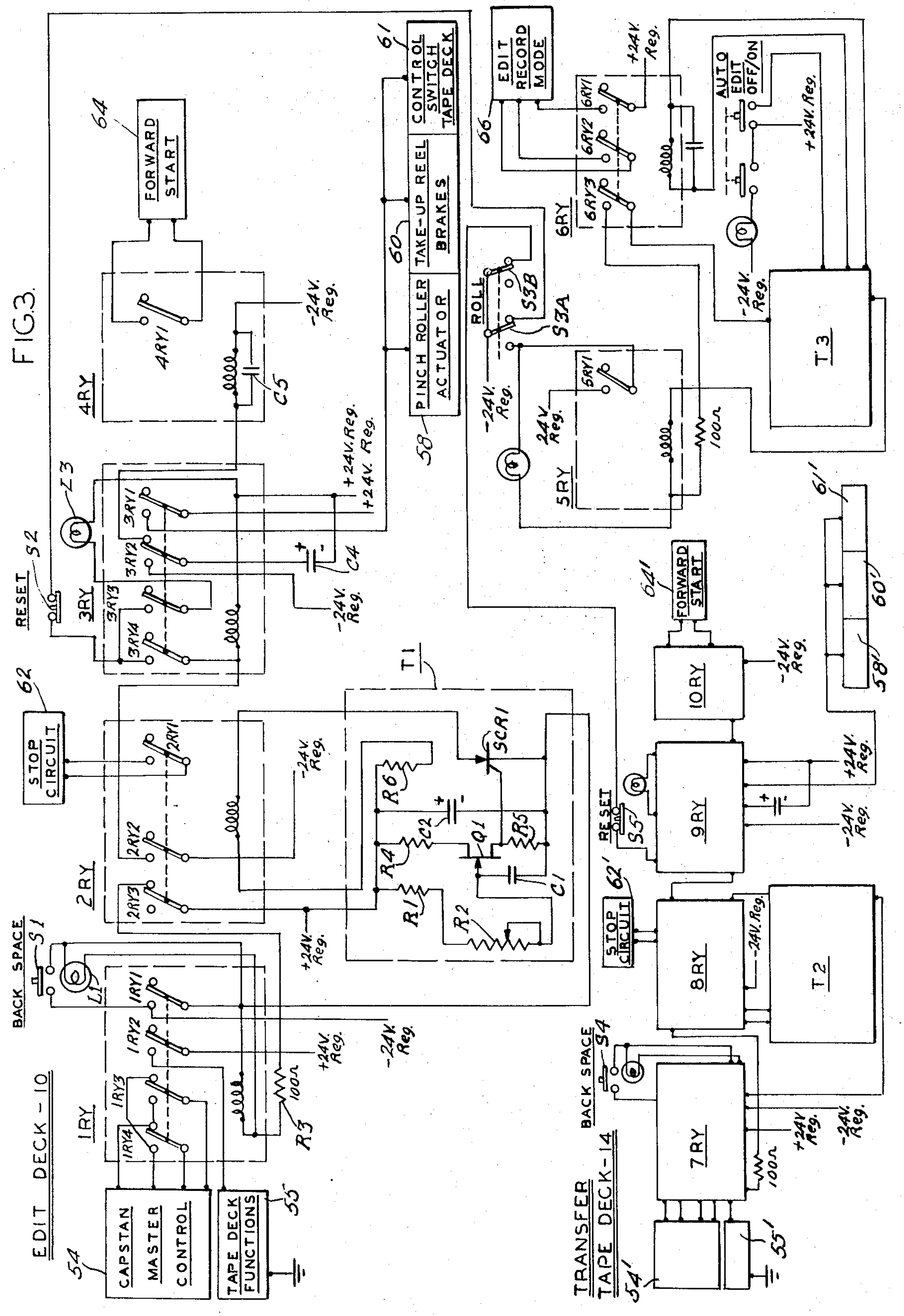

For a better understanding of the present invention reference is made to the accompanying drawings in which FIG. 1 is a schematic block diagram of an editing system in accordance with the present invention;

FIG. 2 is a schematic drawing showing some of the mechanical parts of a tape deck which are involved in the present invention, other parts not being shown; and FIG. 3 is a circuit diagram partially in block form of a preferred embodiment of control system modifications for the magnetic tape editing system of the present invention.

FIG. 1 is intended to show schematically the configuration of an overall system of tape decks and controls used in magnetic tape editing. The tape being edited may be video, audio, instrumentation or data tape and editing is ordinarily done from the same kind of tape or tapes or a data web of some type such as movie film or punched paper tape. Commonly the edited tape is transported by the edit tape deck 10 which has both play-back and record modes. To this tape deck 10, which may be of any commercially avaiable type are added roll-back control modifications 12. In a given case where a synchronous motor is supplied which is reversible to drive the capstan driving the tape both forward and backward at the same constant speed a minimum of modification needs to be made. Frequently, this reversing feature is not provided but can be accomplished by modification of wiring in a way known per se and addition of suitable reversing controls. In any event, the controls 12 require the addition of a timer 12*a*, which may be either electrical or mechanical. The timer 12*a* is preferably adjustable and is arranged to be started manually in coordination with the initiation of tape back-spacing (reversal) and to terminate the roll-back after a time determined by setting of the timer. Thus adjustment of the timer will change the amount of roll-back occurring from a selected point.

At least one other web handling deck is provided and it may be a tape deck 14, similar to edit tape deck 10 with 16, including a timer 16a, similar to controls 12 for edit tape deck 10. Alternatively data web deck 18, such as a deck for playing movie film or some other type of continuous information bearing web may be used with conventional signal convertor means 20 for conversion of its output to signals usable by the magnetic tape on the edit deck 10. Like magnetic table decks, the movie film or other web deck 18 has controls 22 which are modified to provide reverse of the forward drive and timing means 22*a* to interupt the roll-back spacing at a point that will assure that the deck and equipment has gotten up to full speed by the point of edit.

As shown in addition to the possibility of a single additional deck, it is common in an editing studio to have decks to handle transfer of many different signals to the edit tape deck, including different kinds of continuous web decks (particularly movie film decks, perhaps of different size) with appropriate converters means to convert their outputs to magnetic tape recordable form. These are here represented as Decks I, II. . . . N. It is of course common to transfer outputs from only one deck at a time to be recorded at the edit deck. Here deck N 24 is broadly of the same type as other decks and has roll-back control modifications 26 including a timer 26*a*.

In operation the roll backspace controls on each deck are individually timed out and their timers adjusted. Thereafter the timers are set at the same time, the longest roll-back time required. It is convenient not to have to readjust timing so that in the studio the largest roll-back will determine the roll-back time for all decks. Because roll-back in the system must be a uniform timed amount from the edit point, the timer in the roll-back control of the edit deck can be used to place the edit deck 10 in record mode at the edit point. However, greater flexibility in the system is achived if a separate start record timer 28 is provided to activate the record mode of the edit tape deck at the proper edit point. When start record timer 28 is employed the simultaneous start means 30, may be a common pushbutton arranged to start the edit deck, the transfer deck and the start record timer at the same time. A selector switch 32 determines which of the transfer decks is employed with the edit deck, only one being used at a time. Whichever one is selected then generates an output, either directly or after conversion to tape recordable intelligence. Since outputs of all decks are connected to the record head input of edit tape deck 10, the system selected by switch 32 will have its message transferred to the edited tape.

Referring to FIG. 2 the schematic drawing represents those parts of a tape deck, without reference to the physical form or geometrical configuration, which are of no particular significance in connection with the present invention. As shown the tape 40 is fed along a tape path between supply reel 42 and take-up reel 44, in the course of which it passes a plurality of heads including recording head 46 and play-back head 48. Also involved is drive capstan 50 which is driven by a synchronous motor 52 under the control of capstan motor control 54. Cooperating with the capstan 50 and insuring non-slipping drive of the tape is a pinch roller 56 which is engaged and disengaged with the capstan by the pinch roller actuator mechanism 58. Also provided are take-up reel brakes 60.

FIG. 3 illustrates in some detail a preferred embodiment of modifications to controls of a pair of tape decks to enable their use in an editing system. FIG. 1 makes it clear that additional decks whether tape, movie or other continuous data web can be added to the system and their modification over conventional devices is repetitious of what is shown in FIG. 3.

Referring to FIG. 3, the control modifications shown for an edit tape deck corresponding to deck 10 in FIG. 1 employs four relays 1RY, 2RY, 3RY and 4RY, together with the timing system T1. These relays under the control of the timing system act to control such components as the capstan motor control 54, the pinch roller actuator 58 and the take-up reel brakes 60. The desired point of editing video tape may be ascertained precisely by visual inspection. When such a cue for editing is observed just at that point the roll-back switch S1 is pushed causing that switch, which is normally open, to close. A momentary contact of switch S1 is sufficient because upon closing S1 relay 1RY is energized actuating its contacts, including contacts 1RY1 through which S1 is by-passed to hold relay 1RY latched. The winding of relay 1RY is energized by connection across +24 v and −24 v through these contacts and normally closed contacts 2 RY4 of relay 2RY. Indicator lamp L1 is in parallel with the winding of relay 1RY and is therefore lit when the winding is energized.

Simultaneously timer T1 is supplied with −24 v d.c. potential through contacts 1RY2, which starts the timer T1, whose operation will be explained below. At the same time contacts 1RY3 and 1RY4 have their conditions changed, thereby interchanging motor lead connections and reversing the direction of drive of the capstan motor 52 through motor control 54. Control voltage for tape deck functions, represented as controls 55, is also supplied through contacts 1RY2. These functions may include reversing the supply reel, controlling proper tensions and in some tape decks engaging a planetary idler wheel for reversing both supply and takeup reels, all of which can be done through an energized solenoid.

When power (−24 v d.c.) is applied to timer T1 through contacts 1RY1, capacitor C1 is conneced between +24 v and −24 v and begins to charge through resistors R1 and R2. R2 is a variable resistor and its resistance change changes the rate of charge of capacitor C1. Variable resistor R2 then amounts to an adjustment of the timing of timer T1. The timing of timer depends upon the time required to reach a certain charge on capacitor C1, which is a function of the RC network, including resistors R1 and R2 and capacitor C1. When the voltage on capacitor C1 reaches the firing point of unijunction transistor Q1, Q1 conducts through allowing current flow through the series resistors R4 and R5, which it separates and which provide a voltage divider. The control electrode of silicon controlled rectifier SCR1 is connected to the junction of the voltage divider at the unijunction transistor Q1 the current flow through which produces the trigger voltage which causes silicon control rectifier SCR1 to fire.

The relay 2RY is energized momentarily when SCR1 fires. This opens the latching circuit through the winding of relay 1RY as contacts 2RY3 open from their normally closed condition. As 1RY is deenergized its contacts change condition causing the forward direction of rotation of the capstan motor to be restored as well as removing power from the motor and releasing the solenoid operated planetary idler reversing the direction of the reels.

When relay 2RY is energized, its normally open contacts 2RY2 are closed connecting the winding of relay 3RY between a +24 v and a −24 v supply and energizing relay 3RY. Normally open contacts 2RY1 close to actuate an edit tape deck stop circuit 62, which for example may depend on momentary actuation of fast responding latching solenoid.

Relay 3RY is self-latching through it contacts 3RY4 and through switches S2 and S3A between +24 v and −24 v. Indicator lamp L3 is in parallel with the winding of relay 3RY and is therefore lit when the winding is energized. Normally open contacts 3RY1 close to connect the 24 v power supply to the pinch roller actuator 58 to disengage it and prevent drive of the tape in either direction. The same contacts may energize the mechanism 60 for applying brakes to the takeup reel and in some systems open contacts controlling the tape deck to aid in stopping the deck, at control switch 61.

During the time that relay 3RY is energized, capacitor C4 is charged through the closed, normally open switch contacts 3RY2. Upon depressing the reset button S2 or roll button S3A, each of which open the circuit to the winding of 3RY momentarily, relay 3RY is deenergized causing any charge accumulated on capacitor C4 through normally closed contacts 3RY2 to be applied through the winding of relay 4RY, energizing that relay for a very short duration. Relay 4RY is used for the purpose of providing momentary contact to control the roll or play function. In order to extend the period of energization somewhat capacitor C5 is provided across the winding of relay 4RY. The sole contacts 4RY1 of relay 4RY initiate forward roll of the tape on edit tape deck 10 through activation of an appropriate start circuit 65.

It will be understood that the operation of other data web decks in the system will be exactly parallel to the operation of edit deck 10. Since only one other deck is used at a time transfer tape deck 14 is shown by way of example. Relays 5RY, 6RY,7RY and 8RY correspond to relays 1RY, 2RY, 3RY and 4RY, respectively, and timer T2 corresponds to timer T1. Schematically shown deck controls corresponding to those of the edit deck have similar identification numbers but with addition of primes thereto. The system and operation of tape deck 14 is essentially identical to the operation of deck 10 described.

To summarize the tape decks, pressure on S1, or S4, a momentary pushbutton energizes relay 1RY, or 7RY, and locks in that relay due to self-latching features; the period of holding relay 1RY, or 7RY, latched is determined by the period of timing by timer T1, or T2. S1, or S4, also initiates reversal of capstan motor 52, or its equivalent in deck 14, acting through its control 54, or 54′, and may also reverse supply and takeup reel drives, thus initiating roll-back of the tape from the editing point selected at the pressing of switch button S1. At the end of the timing interval established by timer T1, or T2, relay 7, or 8RY, is energized operating stop circuit 62, or 62′. Relay 1RY, or 7RY, is released again reversing capstan motor 52, or its equivalent in deck 14, through its controls 54, or 54′, and the drive for the takeup reels is also released.

Relay 3RY, or 9RY, remains in latched condition until the operator decides to reset with switch S2, or S5, or an editor begins the editing operation with "roll" switches S3A and S3B simultaneously, part of the start coordination means 30.

Editing also involves use of the start record timer 28 consisting of relays 5RY and 6RY and timer T3. To start the editing the ganged "roll" S3A and S3B are actuated. S3A is also provided with contact means to momentarily energize relay 5RY by connection to a −24 v power source. Closing of contacts 5RY1 provides an alternate route to the −24 v power source. The start record timer 28 then is started as the tapes on decks 10 and 14 begin to roll forward. Contacts 5RY1 also connect and energize timer T3 which is like, and operates like, timer T1. When timing is completed by timer T3 the current flow through its SCR energizes the winding of relay 6RY. Relay 6RY has normally closed contacts 6RY3 which open the circuit through and unlatch relay 5RY, as relay 2RY does in the case of relay 1RY. The normally open contacts 6RY1 and 6RY2, when closed operate the record mode control 66 on the edit tape deck the timing of timer T3 being such to start recording on the edit tape deck just at the desired edit point.

It will be clear that repositioning of the selection switch 32 with substitute data web deck 18, deck N, or any other selected deck of the system in place of transfer tape deck 14. Operation with the substituted deck will be essentially the same in important respects despite differences in the type of deck and data web, provided, of course, suitable conversion means 20 is employed.

A preferred embodiment of the invention with certain modifications thereof is suggested. It will be clear to those skilled in the art other modifications within the scope of the appended claims may be made within the scope and spirit of the present invention.

I claim:

1. The method of preparing a tape deck for editing at a predetermined point comprising determining the amount of roll-back of tape from the editing point necessary to allow tape to start from a stopped condition and reach full forward speed by the editing point, providing a positive fixed speed reverse drive, and timing the period of roll-back by the reverse drive to achieve the necessary roll-back.

2. The method of claim 1 employing two or more tape decks, applying roll-back individually to each of the two or more tape decks and coordinating said decks to reach predetermined points at full speed simultaneously so that they may be used in the editing process.

3. The method of editing magnetic tape from other tapes, film, or the like, employing an edit tape deck transporting a tape to be edited and another web handling deck and means for transferring editing information from the said other web handling deck to the edit tape deck comprising ascertaining the periods of time required for each deck employed to reach full speed from a stopped condition, adjusting all tape decks to roll-back their tapes the same amount of time from a point edit, which time is at least sufficient to allow the slowest deck to accelerate to reach full speed at the edit point, starting the edit and the other decks simultaneously from the point of roll-back, and at the predetermined edit point, placing the edit tape deck in record mode while the other deck is in play-back mode and transferring its information to the edit tape deck for recording on the edited tape.

4. The method of achieving desired roll-back to cause tape started from a complete stop to achieve full speed at a predetermined edit point, where the same drive means is used in moving the tape forward and backward at the same speed, timing the period of successive steps of reverse drive, observing the forward drive from each successive reverse drive position relative to the desired edit point, and adjusting the timing until a time is selected which achieves full speed at the edit point, and thereafter timing the back-spacing to coincide with said selected time.

5. In a data web deck comprising at least web supply and takeup means and web drive means including a fixed speed motor means and at least play-back means for obtaining intelligence recorded on said web, the improvement comprising means permitting reversal of said motor means and said web drive means, and adjustable timer means permitting roll-back of a web from an edit point to be stopped repeatedly at the same point for a given setting of said timer means and permitting the amount of roll-back to be adjusted by adjustment of the timer until it is at least sufficiently long to permit the web deck to reach full recording speed at least at the point of edit.

6. The data web deck of claim 5 in which the data web is magnetic tape and the deck a magnetic tape deck.

7. The data web deck of claim 6 in which the magnetic tape is video tape and the deck is a video tape deck.

8. The data web back of claim 6 in which the magnetic tape is audio tape and the deck is an audio tape deck.

9. A system for editing magnetic tape without splicng comprising an edit tape deck having record and play modes and a fixed speed tape drive which permits reversal to cause roll-back of the tape from a preselected edit point and a timer determining a fixed amount of roll-back from an edit point sufficient to allow said edit deck to reach full record speed before the edit point, a data web deck having a play mode and a fixed speed web drive which permits reversal to cause roll-back of the web from a preselected edit point and a timer determining a fixed amount of roll-back from an edit point sufficient to allow said web deck to reach full speed before the edit point, means associated with said data web deck producing an output from said deck which is recordable by magnetic tape on the edit deck, and coordination means associated with said respective decks to start them from their roll-back positions established by their respective timers and cause them to reach a predetermined common edit point simultaneously.

10. The system of claim 9 in which the drive means for the respective decks are selected so that by starting from their respective roll-back points the coordination means causes the forward drive of the decks, starting simultaneously, to cause both tapes to reach the edit point together.

11. The system of claim 10 in which that deck which has a shorter roll-back time has means enabling that time increased to be equal to roll-back time of the other deck.

12. The system of claim 11 in which an auxiliary start record time is employed together with means responsive to that time to place the edit deck in record mode at the edit point and means is provided to start the start record timer simultaneously with the decks.

13. The system of claim 9 in which a plurality of data web decks is associated with the edit tape deck, each of said data web decks being of the kind described and selection means is provided to permit a choice of which data web deck will be employed at any selected point in the editing process.

14. The system of claim 13 in which at least one of the data web decks employed includes pictorial data.

15. The system of claim 14 in which at least one of the data web decks is a movie deck for playing movie film and converting its output to a video tape signal suitable for recording on a video tape being edited on the edit tape deck.

16. The system of claim 14 in which at least one of the data web decks is a video tape deck producing an output on play suitable for direct recording without conversion onto a video tape being edited on the edit tape deck.

* * * * *

UNITED STATES PATENT OFFICE
CERTIFICATE OF CORRECTION

Patent No. 3,787,617 Dated January 22, 1974

Inventor(s) Anthony M. Fiori

It is certified that error appears in the above-identified patent and that said Letters Patent are hereby corrected as shown below:

Column 2, line 22, before "dynamic" insert -- different --.

Column 2, line 41, "amount being" should be deleted;

Column 2, line 57, "amounts" should be --amount--;

Column 2, line 61, "observation" should be --by observation--;

Column 4, line 11, "achived" should be --achieved--;

Column 4, line 53, after "such" and before "components" should be --deck--;

Column 6, line 10, "65" should be --64--;

Column 7, line 34, after "point" and before "edit" should be --of--;

Column 8, line 9, "back" should be --deck--;

Column 8, line 12, "splicng" should be --splicing--;

Column 8, line 46, "time" should be --timer--

Signed and sealed this 24th day of September 1974.

(SEAL)
Attest:

McCOY M. GIBSON JR.
Attesting Officer

C. MARSHALL DANN
Commissioner of Patents